United States Patent
Sato et al.

(10) Patent No.: US 12,480,015 B2
(45) Date of Patent: Nov. 25, 2025

(54) INK JET INK SET FOR IMPERMEABLE BASE MATERIAL, IMAGE RECORDING METHOD, IMAGE RECORDED MATERIAL, LAMINATE, AND METHOD OF PRODUCING LAMINATE

(71) Applicant: FUJIFILM Corporation, Tokyo (JP)

(72) Inventors: Ayato Sato, Kanagawa (JP); Toshihiro Kariya, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 18/353,500

(22) Filed: Jul. 17, 2023

(65) Prior Publication Data

US 2024/0043712 A1 Feb. 8, 2024

Related U.S. Application Data

(63) Continuation of application No. PCT/JP2022/003842, filed on Feb. 1, 2022.

(30) Foreign Application Priority Data

Feb. 3, 2021 (JP) .................. 2021-015957

(51) Int. Cl.
  *C09D 11/54* (2014.01)
  *C09D 11/38* (2014.01)
(52) U.S. Cl.
  CPC .............. *C09D 11/54* (2013.01); *C09D 11/38* (2013.01)

(58) Field of Classification Search
  CPC ....... C09D 11/54; C09D 11/38; C09D 11/102; C09D 11/107; C09D 11/322; C09D 11/40; B41M 5/0011; B41M 5/0017
  See application file for complete search history.

(56) References Cited

U.S. PATENT DOCUMENTS

| | | | |
|---|---|---|---|
| 6,194,347 | B1 | 2/2001 | Narita et al. |
| 2014/0118449 | A1 | 5/2014 | Sarkisian et al. |
| 2016/0312053 | A1 | 10/2016 | Yano |
| 2016/0312061 | A1 | 10/2016 | Aoai |

(Continued)

FOREIGN PATENT DOCUMENTS

| | | |
|---|---|---|
| CN | 110831774 A | 2/2020 |
| CN | 111727226 A | 9/2020 |

(Continued)

OTHER PUBLICATIONS

Hattori Kazumasa et al., "Aqueous Recording Liquid Set, and Method for Manufacturing Printed Matter Using the Same" (JP 2019094377 A), Jun. 20, 2019, [Abstract, Tech Solutions, Description of Embodiments] (Year: 2019).*

(Continued)

*Primary Examiner* — Lisa Solomon
(74) *Attorney, Agent, or Firm* — Sughrue Mion, PLLC

(57) ABSTRACT

Provided are an ink jet ink set for an impermeable base material, including a pretreatment liquid containing a resin and water, and an ink containing a pigment, a resin, and water, in which an equilibrium moisture content of a solid content in the pretreatment liquid at 25° C. and 50% RH is 3.0% by mass or less, and an equilibrium moisture content of a solid content in the ink at 25° C. and 50% RH is 3.0% by mass or less, and applications thereof.

12 Claims, 1 Drawing Sheet

(56) References Cited

U.S. PATENT DOCUMENTS

| | | |
|---|---|---|
| 2018/0030298 A1 | 2/2018 | Yamazaki et al. |
| 2020/0131394 A1 | 4/2020 | Fujii et al. |
| 2020/0369904 A1 | 11/2020 | Fujii et al. |

FOREIGN PATENT DOCUMENTS

| | | | |
|---|---|---|---|
| JP | 10-193805 A | | 7/1998 |
| JP | 10-296864 A | | 11/1998 |
| JP | 2002-200717 A | | 7/2002 |
| JP | 2007-268937 A | | 10/2007 |
| JP | 2013-010823 A | | 1/2013 |
| JP | 2016-203470 A | | 12/2016 |
| JP | 2019-006944 A | | 1/2019 |
| JP | 2019-077797 A | | 5/2019 |
| JP | 2019-94377 A | | 6/2019 |
| JP | 2019094377 A | * | 6/2019 |
| JP | 2019-155702 A | | 9/2019 |
| WO | 2016/152580 A1 | | 9/2016 |
| WO | 2019/163581 A1 | | 8/2019 |
| WO | 2020/195211 A1 | | 10/2020 |

OTHER PUBLICATIONS

Extended European Search Report dated Jul. 31, 2024 in Application No. 22749705.4.
International Search Report for PCT/JP2022/003842 dated May 10, 2022.
Written Opinion for PCT/JP2022/003842 dated May 10, 2022.
International Preliminary Report on Patentability dated Aug. 3, 2023 in Application No. PCT/JP2022/003842.
Communication dated May 10, 2024 issued by the State Intellectual Property Office of the P.R.China in application No. 202280012788.0.
Communication issued May 13, 2025 in Japanese application No. 2022-579552.
Communication dated Aug. 6, 2025 in European Application No. 22 749 705.4.

* cited by examiner

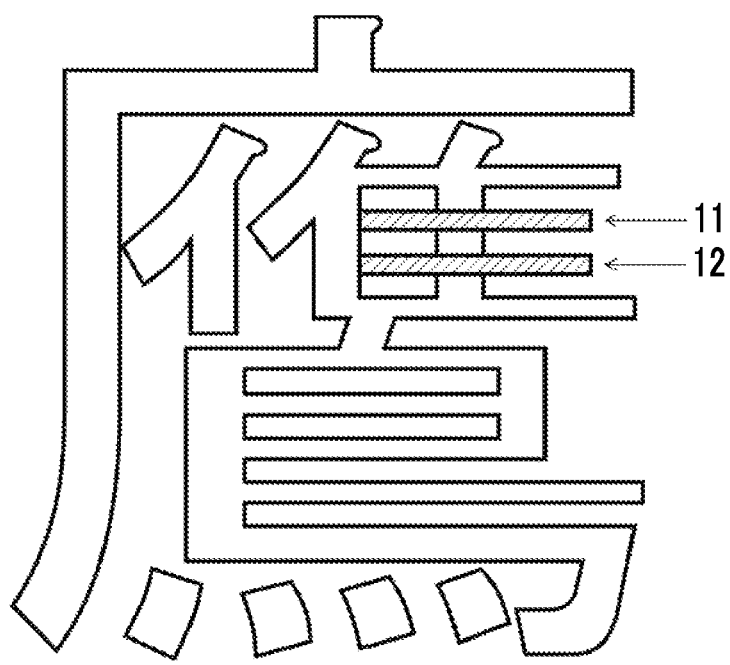

INK JET INK SET FOR IMPERMEABLE BASE MATERIAL, IMAGE RECORDING METHOD, IMAGE RECORDED MATERIAL, LAMINATE, AND METHOD OF PRODUCING LAMINATE

CROSS-REFERENCE TO RELATED APPLICATION

This application is a Continuation of International Application No. PCT/JP2022/003842, filed Feb. 1, 2022, which claims priority to Japanese Patent Application No. 2021-015957 filed Feb. 3, 2021. Each of the above applications is hereby expressly incorporated by reference, in its entirety, into the present application.

BACKGROUND OF THE INVENTION

1. Field of the Invention

The present disclosure relates to an ink jet ink set for an impermeable base material, an image recording method, an image recorded material, a laminate, and a method of producing a laminate.

2. Description of the Related Art

In the related art, various examinations have been conducted on image recording carried out using a pretreatment liquid and an ink.

For example, JP2016-203470A describes an ink jet including at least an ink composition that contains a resin having a water absorption rate of 0.3% or less and water, and a reaction solution that contains an aggregating agent having a solubility of 120 g or less in 100 g of water as an aggregating agent aggregating components of the ink composition, in which the ink set is used for recording an image on a low-absorptive recording medium or a non-absorptive recording medium.

SUMMARY OF THE INVENTION

A laminate may be produced by recording an image on an impermeable base material to obtain an image recorded material and laminating a base material for lamination on the image in the image recorded material. Further, in a case where the laminate is subjected to a boiling treatment, the laminate is required to have improved lamination strength between the image recorded material and the base material for lamination in some cases.

The present disclosure has been made in view of the above-described circumstances, and an object of one embodiment of the present disclosure is to provide an ink jet ink set for an impermeable base material and an image recording method, which enable an image recorded material with excellent lamination strength to be obtained in a case where a base material for lamination is laminated on an image recorded material to produce a laminate and the laminate is subjected to a boiling treatment.

An object of another embodiment of the present disclosure is to provide a method of producing a laminate, which enables production of a laminate with excellent lamination strength between a base material for lamination and an image recorded material in a case where a boiling treatment is performed.

An object of still another embodiment of the present disclosure is to provide an image recorded material with excellent lamination strength in a case where a laminate is subjected to a boiling treatment.

An object of even still another embodiment of the present disclosure is to provide a laminate with excellent lamination strength between a base material for lamination and an image recorded material in a case where a boiling treatment is performed.

The present disclosure includes the following aspects.

<1> An ink jet ink set for an impermeable base material, comprising: a pretreatment liquid containing a resin and water; and an ink containing a pigment, a resin, and water, in which an equilibrium moisture content of a solid content in the pretreatment liquid at 25° C. and 50% RH is 3.0% by mass or less, and an equilibrium moisture content of a solid content in the ink at 25° C. and 50% RH is 3.0% by mass or less.

<2> The ink jet ink set for an impermeable base material according to <1>, in which the equilibrium moisture content of the solid content in the pretreatment liquid at 25° C. and 50% RH is less than the equilibrium moisture content of the solid content in the ink at 25° C. and 50% RH.

<3> The ink jet ink set for an impermeable base material according to <1> or <2>, in which the resin contained in the ink contains resin particles.

<4> The ink jet ink set for an impermeable base material according to any one of <1> to <3>, in which the resin contained in the ink contains resin particles having an acid value of less than 30 mgKOH/g and resin particles having an acid value of 30 mgKOH/g or greater.

<5> The ink jet ink set for an impermeable base material according to <4>, in which a mass ratio of a content of the resin particles having an acid value of less than 30 mgKOH/g to a content of the resin particles having an acid value of 30 mgKOH/g or greater is in a range of 1.5 to 4.0.

<6> The ink jet ink set for an impermeable base material according to any one of <1> to <5>, in which the equilibrium moisture content of the solid content in the ink at 25° C. and 50% RH is 1.5% by mass or less.

<7> The ink jet ink set for an impermeable base material according to any one of <1> to <6>, in which the equilibrium moisture content of the solid content in the pretreatment liquid at 25° C. and 50% RH is 1.5% by mass or less.

<8> The ink jet ink set for an impermeable base material according to any one of <1> to <7>, in which the resin contained in the pretreatment liquid and the resin contained in the ink are each an acrylic resin or a urethane resin.

<9> An image recording method using the ink jet ink set for an impermeable base material according to any one of <1> to <8>, the method comprising: a step of applying the pretreatment liquid onto an impermeable base material; and a step of applying the ink onto the impermeable base material onto which the pretreatment liquid has been applied, using an ink jet recording method, to record an image.

<10> A method of producing a laminate, comprising: a step of obtaining an image recorded material that includes the impermeable base material and an image disposed on the impermeable base material by the image recording method according to <9>; and a step of laminating a base material for lamination on a side of the image recorded material where the image has been disposed, to obtain a laminate.

<11> An image recorded material comprising: an impermeable base material; and an image disposed on the impermeable base material, in which the image includes a pretreatment layer disposed on the impermeable base material and containing a resin, and an ink layer disposed on the pretreatment layer and containing a pigment and a resin, an equilibrium moisture content of the pretreatment layer at 25° C. and 50% RH is 3.0% by mass or less, and an equilibrium moisture content of the ink layer at 25° C. and 50% RH is 3.0% by mass or less.

<12> A laminate comprising: the image recorded material according to <11>; and a base material for lamination which is laminated on an image of the image recorded material.

According to one embodiment of the present disclosure, it is possible to provide an ink jet ink set for an impermeable base material and an image recording method, which enable an image recorded material with excellent lamination strength to be obtained in a case where a base material for lamination is laminated on an image recorded material to produce a laminate and the laminate is subjected to a boiling treatment.

According to another embodiment of the present disclosure, it is possible to provide a method of producing a laminate, which enables production of a laminate with excellent lamination strength between a base material for lamination and an image recorded material in a case where a boiling treatment is performed.

According to still another embodiment of the present disclosure, it is possible to provide an image recorded material with excellent lamination strength in a case where a laminate is subjected to a boiling treatment.

According to even still another embodiment of the present disclosure, it is possible to provide a laminate with excellent lamination strength between a base material for lamination and an image recorded material in a case where a boiling treatment is performed.

BRIEF DESCRIPTION OF THE DRAWINGS

FIG. 1 is a view for describing the details of evaluation standards for the character quality in examples.

DESCRIPTION OF THE PREFERRED EMBODIMENTS

Hereinafter, an ink jet ink set for an impermeable base material, an image recording method, and a method of producing a laminate according to the present disclosure will be described in detail.

In the present specification, a numerical range shown using "to" indicates a range including the numerical values described before and after "to" as a minimum value and a maximum value, respectively.

In a numerical range described in a stepwise manner in the present disclosure, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present invention, a combination of two or more preferred embodiments is a more preferred embodiment.

In the present disclosure, the meaning of the term "step" includes not only an independent step but also a step whose intended purpose is achieved even in a case where the step is not clearly distinguished from other steps.

In the present specification, the term "image" denotes an entire film formed by applying a pretreatment liquid and an ink in this order, and the term "image recording" denotes formation of an image (that is, the film).

Further, the concept of "image" in the present specification also includes a solid image.

In the present specification, the concept of "(meth)acrylate" includes both acrylate and methacrylate. In addition, the concept "(meth)acryl" includes both acryl and methacryl.

In the present specification, the term "boiling treatment" denotes a treatment of immersing an object (specifically, a laminate) in water at 60° C. to 100° C. and heating the object for a certain time (for example, 10 minutes to 120 minutes).

[Ink Jet Ink Set for Impermeable Base Material]

An ink jet ink set for an impermeable base material of the present disclosure is an ink set including a pretreatment liquid containing a resin and water, and an ink containing a pigment, a resin, and water, in which the equilibrium moisture content of the solid content in the pretreatment liquid at 25° C. and 50% RH is 3.0% by mass or less, and the equilibrium moisture content of the solid content in the ink at 25° C. and 50% RH is 3.0% by mass or less.

According to the ink set of the present disclosure, it is possible to obtain an image recorded material including an impermeable base material, and an image recorded on the impermeable base material, in which the image recorded material has excellent lamination strength even in a case where a base material for lamination is laminated on the image to produce a laminate and the laminate is subjected to a boiling treatment.

Here, the lamination strength denotes peel strength in a case of peeling the base material for lamination and the image recorded material from the laminate formed by lamination [that is, the laminate having a laminated structure of "base material for lamination/image recorded material" (specifically, a laminated structure of "base material for lamination/image/impermeable base material")].

The reason why the above-described effects are exhibited by the ink set of the present disclosure is presumed as follows.

In order to improve the lamination strength in the laminate, it is necessary to improve the adhesiveness between the impermeable base material and the image and to improve the adhesiveness between the image and the base material for lamination as a premise.

In the ink set of the present disclosure, the equilibrium moisture content of the solid content in the pretreatment liquid at 25° C. (temperature) and 50% relative humidity (RH) is 3.0% by mass or less, and the equilibrium moisture content of the solid content in the ink at 25° C. (temperature) and 50% relative humidity (RH) is 3.0% by mass or less. In this manner, it is presumed that since the adhesiveness between the pretreatment layer formed by the application of the pretreatment liquid and the ink layer formed by the application of the ink is improved, expansion inside the ink layer is suppressed, and the adhesiveness between the ink layer and the base material for lamination is improved, the lamination strength after the boiling treatment is improved.

Meanwhile, since the pretreatment liquid of the ink set disclosed in JP2016-203470A does not contain a resin, the adhesiveness between the pretreatment layer and the ink layer is considered to be degraded, and the lamination strength after the boiling treatment is considered to be insufficient. Further, in the related art, in an ink set including a pretreatment liquid and an ink, no attention has been paid to the equilibrium moisture contents of the pretreatment liquid and the ink at 25° C. and 50% RH.

Hereinafter, each component contained in the pretreatment liquid and the ink of the ink set according to the embodiment of the present disclosure will be described.

[Ink Set]

<Ink>

The ink in the ink set of the present disclosure contains a pigment, a resin, and water.

(Pigment)

The ink included in the ink set of the present disclosure contains a pigment. The ink may contain one or two or more kinds of pigments.

A commercially available organic pigment or inorganic pigment may be used as the pigment. Examples of the pigment include pigments described in "Encyclopedia of Pigments" edited by Seishiro Ito (2000), "Industrial Organic Pigments", W. Herbst, K. Hunger, JP2002-12607A, JP2002-188025A, JP2003-26978A, and JP2003-342503A.

Further, the pigment may be a water-insoluble pigment that can be dispersed in water by a dispersing agent, or may be a self-dispersion type pigment. The self-dispersion type pigment is a pigment that can be dispersed in water without using a dispersing agent. The self-dispersion type pigment is, for example, a compound in which at least one selected from the group consisting of hydrophilic groups such as a carbonyl group, a hydroxyl group, a carboxyl group, a sulfo group, and a phosphoric acid group and salts thereof is chemically bonded to a surface of a pigment directly or via another group.

Examples of the organic pigment include an azo pigment, a polycyclic pigment, a chelate dye, a nitro pigment, a nitroso pigment, and aniline black. Examples of the azo pigment include azo lake, an insoluble azo pigment, a condensed azo pigment, and a chelated azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the chelate dye include a basic dye-type chelate and an acid dye-type chelate.

Examples of the inorganic pigment include titanium oxide, iron oxide, calcium carbonate, barium sulfate, aluminum hydroxide, barium yellow, cadmium red, chrome yellow, and carbon black.

From the viewpoints of the image density and the jettability of the ink, the content of the pigment in the ink is preferably in a range of 1% by mass to 20% by mass, more preferably in a range of 1% by mass to 15% by mass, and still more preferably in a range of 1% by mass to 10% by mass with respect to the total amount of the ink.

(Resin)

The ink included in the ink set of the present disclosure contains a resin. The ink may contain one or two or more kinds of resins.

The resin contained in the ink may be a dispersing agent having a function of dispersing the pigment contained in the ink, or may be a resin added to the ink separately from the dispersing agent. Therefore, the ink may contain only a resin that functions as a dispersing agent, or may contain a resin that functions as a dispersing agent and a resin other than the resin that functions as a dispersing agent. Further, in a case where the pigment contained in the ink is a self-dispersion type pigment, the ink may contain only a resin other than the resin that functions as a dispersing agent.

The kind of the resin contained in the ink is not particularly limited, and examples thereof include an acrylic resin, an epoxy resin, a urethane resin, polyether, polyamide, a phenol resin, a silicone resin, a fluororesin, a vinyl resin (such as a vinyl chloride resin, a vinyl acetate-based resin, a vinyl alcohol-based resin, or a vinyl butyral-based resin), an alkyd resin, a polyester resin, a melamine resin, a melamine formaldehyde resin, an aminoalkyd cocondensation resin, and a urea resin. Among these, from the viewpoints of the lamination strength and improvement of the lamination strength after the boiling treatment, it is preferable that the resin contained in the ink is an acrylic resin or a urethane resin.

In the present disclosure, the acrylic resin denotes a polymer having a structural unit derived from a (meth)acrylic compound containing an acryloyl group ($CH_2$=$CH$—$C$(=$O$)—) or a methacryloyl group ($CH_2$=$C$($CH_3$)—$C$(=$O$)—). Examples of the (meth)acrylic compound include (meth)acrylic acid, (meth)acrylic acid ester, and (meth)acrylamide. Examples of the structural unit other than the structural unit derived from the (meth)acrylic compound in the acrylic resin include a structural unit derived from styrene. A styrene acrylic resin is included in the acrylic resin.

In the present disclosure, the urethane resin denotes a polymer having a urethane bond. The urethane resin is synthesized, for example, by reacting a diol compound with a diisocyanate compound. For details of the diol compound and the diisocyanate compound, for example, the description in paragraphs 0031 to 0036 of JP2001-247787A can be referred to. Among these, the urethane resin is preferably a polyester-based urethane resin having an ester bond in the main chain, a polycarbonate-based urethane resin having a carbonate bond in the main chain, or a polyether-based urethane resin having an ether bond in the main chain and more preferably a polycarbonate-based urethane resin.

From the viewpoint of the jettability, the content of the resin in the ink is preferably 30% by mass or less, more preferably 20% by mass or less, and still more preferably 10% by mass or less with respect to the total amount of the ink. The lower limit of the content of the resin is not particularly limited, and is, for example, 0.1% by mass.

—Resin that Functions as Dispersing Agent—

A resin that functions as a dispersing agent is typically contained in a pigment dispersion liquid by being mixed with a pigment in advance. The resin that functions as a dispersing agent may be appropriately selected from known dispersing agents of the related art, and may be a random copolymer or a block copolymer. Further, the resin that functions as a dispersing agent may have a crosslinked structure.

It is preferable that the resin that functions as a dispersing agent is a resin having a crosslinked structure (hereinafter, also referred to as "crosslinked resin"). That is, it is preferable that the ink included in the ink set of the present disclosure contains a crosslinked resin. In a case where a part of a surface of a pigment is coated with the crosslinked resin that functions as a dispersing agent, the pigment can be dispersed in water. The crosslinked resin is unlikely to be detached from the surface of the pigment, and thus the pigment can be stably dispersed.

The crosslinked resin is formed by crosslinking a non-crosslinked resin (hereinafter, also referred to as "uncrosslinked resin").

It is preferable that the uncrosslinked resin is water-soluble.

In the present disclosure, the term "water-soluble" indicates a property in which 1 g or greater of a substance is dissolved in 100 g of water at 25° C. As the "water-soluble" property, a property in which 3 g or greater (more preferably 10 g or greater) of a substance is dissolved in 100 g of water at 25° C. is preferable.

Even in a case where the uncrosslinked resin is water-soluble, the crosslinked resin is not necessarily water-soluble.

Examples of the uncrosslinked resin include a vinyl resin, an acrylic resin, a urethane resin, and a polyester resin. Among these, an acrylic resin is preferable as the uncrosslinked resin.

It is preferable that the uncrosslinked resin is a polymer containing a functional group that can be crosslinked by a crosslinking agent. Examples of the crosslinkable functional group include a carboxy group or a salt thereof, an isocyanate group, and an epoxy group. Among these, from the viewpoint of improving the dispersibility of the pigment, a carboxy group or a salt thereof is preferable, and a carboxy group is particularly preferable as the crosslinkable functional group. That is, a polymer containing a carboxy group is preferable as the uncrosslinked resin.

It is preferable that the uncrosslinked resin is a copolymer having a structural unit derived from a monomer containing a carboxy group (hereinafter, referred to as "carboxy group-containing monomer"). The structural unit derived from a carboxy group-containing monomer contained in a copolymer may be used alone or two or more kinds thereof. The copolymer may be a random copolymer or a block copolymer, but is preferably a random copolymer.

Examples of the carboxy group-containing monomer include (meth)acrylic acid, (3-carboxyethyl acrylate, fumaric acid, itaconic acid, maleic acid, and crotonic acid.

From the viewpoints of the crosslinking properties and the dispersibility, (meth)acrylic acid or 3-carboxyethyl acrylate is preferable, and (meth)acrylic acid is more preferable as the carboxy group-containing monomer.

The content of the structural unit derived from a carboxy group-containing monomer is preferably in a range of 5% by mass to 40% by mass, more preferably in a range of 10% by mass to 35% by mass, and still more preferably in a range of 10% by mass to 30% by mass with respect to the total amount of the uncrosslinked resin.

It is preferable that the uncrosslinked resin has a structural unit derived from a hydrophobic monomer in addition to the structural unit derived from a carboxy group-containing monomer. The structural unit derived from a hydrophobic monomer contained in the copolymer may be used alone or two or more kinds thereof.

Examples of the hydrophobic monomer include (meth) acrylate containing an alkyl group having 1 to 20 carbon atoms, (meth)acrylate having an aromatic ring (such as benzyl (meth)acrylate or phenoxyethyl (meth)acrylate), styrene, and a styrene derivative.

The content of the structural unit derived from a hydrophobic monomer is preferably in a range of 60% by mass to 95% by mass, more preferably in a range of 65% by mass to 90% by mass, and still more preferably in a range of 70% by mass to 90% by mass with respect to the total amount of the uncrosslinked resin.

The uncrosslinked resin is preferably a random copolymer having a structural unit derived from a carboxy group-containing monomer and at least one of a structural unit derived from a (meth)acrylate containing an alkyl group having 1 to 20 carbon atoms or a structural unit derived from a (meth)acrylate having an aromatic ring, more preferably a random copolymer having a structural unit derived from (meth)acrylic acid and a structural unit derived from a (meth)acrylate having an aromatic ring, and still more preferably a copolymer having a structural unit derived from (meth)acrylic acid and a structural unit derived from benzyl (meth)acrylate.

The weight-average molecular weight (Mw) of the uncrosslinked resin is not particularly limited, but is preferably in a range of 3,000 to 300,000, more preferably in a range of 5,000 to 200,000, and still more preferably in a range of 7,000 to 100,000 from the viewpoint of the dispersibility of a white pigment.

The preferable ranges of the weight-average molecular weight of the crosslinked resin are the same as the preferable ranges of the weight-average molecular weight of the uncrosslinked resin.

In the present disclosure, the weight-average molecular weight (Mw) is measured by gel permeation chromatography (GPC). The measurement according to GPC is performed by connecting three columns of TSKgeL Super HZM-H, TSKgeL Super HZ4000, and TSKgel Super HZ2000 (all trade names, manufactured by Tosoh Corporation) in series using HLC-8220GPC (manufactured by Tosoh Corporation) and tetrahydrofuran (THF) as an eluent. Further, the measurement is performed under conditions of a sample concentration of 0.45% by mass, a flow rate of 0.35 ml/min, a sample injection volume of 10 µl, and a measurement temperature of 40° C. using a differential refractive index detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

It is preferable that the crosslinking agent used in a case of crosslinking the uncrosslinked resin is a compound having two or more reaction sites with the uncrosslinked resin (for example, a polymer containing a carboxy group). The crosslinking agent may be used alone or in combination of two or more kinds thereof.

As a combination of the crosslinking agent and the uncrosslinked resin, a combination of a compound containing two or more epoxy groups (that is, a bifunctional or higher functional epoxy compound) and a polymer containing a carboxy group is preferable. In this combination, a crosslinked structure is formed by the reaction between the epoxy group and the carboxy group. It is preferable that the crosslinked structure is formed by the crosslinking agent after the pigment is dispersed by the uncrosslinked resin.

Examples of the bifunctional or higher functional epoxy compound include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable as the bifunctional or higher functional epoxy compound.

Commercially available products may be used as the crosslinking agent.

Examples of the commercially available products include Denacol EX-321, EX-821, EX-830, EX-850, and EX-851 (manufactured by Nagase ChemteX Corporation).

From the viewpoints of the crosslinking reaction rate and the dispersion stability after crosslinking, the molar ratio between a reaction site (for example, an epoxy group) in the crosslinking agent and a reaction site (for example, a carboxy group) in the uncrosslinked resin is preferably in a range of 1:1.1 to 1:10, more preferably in a range of 1:1.1 to 1:5, and still more preferably in a range of 1:1.1 to 1:3.

—Resin Other than Resin that Functions as Dispersing Agent—

The ink can be prepared, for example, by adding a resin or the like other than the resin that functions as a dispersing agent to the pigment dispersion liquid. Examples of the resin to be added later include a water-soluble resin and resin particles.

As the water-soluble resin, a water-soluble resin may be selected from the uncrosslinked resins described above. Examples of the water-soluble resin include polyvinyl alcohol, modified polyvinyl alcohol, polyvinylpyrrolidone, a water-soluble cellulose derivative, polyethylene glycol, and poly (meth)acrylonitrile. The water solubility is as described above.

It is preferable that the resin contained in the ink of the ink set according to the present disclosure contains resin particles. In a case where the ink contains resin particles, the resin particles in the ink are brought into contact with the pretreatment liquid in a case where the ink is applied onto the impermeable base material onto which the pretreatment liquid has been applied, and thus the ink is thickened due to aggregation or destabilization of dispersion of the resin particles. In this manner, the landing interference is suppressed, and thus the image quality is improved. Further, in a case where the ink contains the resin particles, the strength of the ink film is improved, and the lamination strength of the image recorded material is improved. It is preferable that the resin contained in the ink contains particles of an acrylic resin or particles of a urethane resin.

The resin particles may contain one or two or more kinds of resins.

It is preferable that the resin contained in the resin particles is a water-insoluble resin.

In the present disclosure, the term "water-insoluble" in a water-insoluble resin indicates a property that the amount of a substance to be dissolved in 100 g of water at 25° C. is less than 1.0 g (more preferably less than 0.5 g).

The resin particles include preferably at least one of particles consisting of an acrylic resin (hereinafter, referred to as "acrylic resin particles") or particles consisting of a urethane resin (hereinafter, also referred to as "urethane resin particles") and more preferably acrylic resin particles.

It is preferable that the resin particles are self-dispersing resin particles.

Examples of the self-dispersing resin particles include resin particles described in paragraphs 0062 to 0076 of JP2016-188345A and paragraphs 0109 to 0140 of WO2013/180074A.

The resin contained in the resin particles has preferably an aliphatic ring or an aromatic ring and more preferably an aromatic ring.

The aliphatic ring is preferably an alicyclic hydrocarbon having 5 to 10 carbon atoms and more preferably a cyclohexane ring structure, a dicyclopentanyl ring structure, a dicyclopentenyl ring, or an adamantane ring.

As the aromatic ring, a naphthalene ring or a benzene ring is preferable, and a benzene ring is more preferable.

From the viewpoint of further improving the dispersibility of the resin particles in water, it is preferable that the resin contained in the resin particles contains an ionic group.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The weight-average molecular weight of the resin in the resin particles is preferably in a range of 1,000 to 300,000, more preferably in a range of 2,000 to 200,000, and still more preferably in a range of 5,000 to 100,000.

From the viewpoint of the jetting stability, the average particle diameter of the resin particles is preferably in a range of 1 nm to 200 nm, more preferably in a range of 3 nm to 200 nm, and still more preferably in a range of 5 nm to 50 nm. Further, the average particle diameter of the resin particles is acquired by measuring the volume average particle diameter using a particle size distribution measuring device, for example, "NANOTRAC UPA-EX150" (product name, manufactured by Nikkiso Co., Ltd.) according to a dynamic light scattering method.

The acid value of the resin particles contained in the ink is preferably 70 mgKOH/g or less, more preferably 30 mgKOH/g or less, and still more preferably 20 mgKOH/g or less. The lower limit of the acid value of the resin particles contained in the ink is not particularly limited, but may be 0 mgKOH/g. The acid value of the resin particles contained in the ink is preferably 1 mgKOH/g or greater and more preferably 2 mgKOH/g or greater.

From the viewpoint of improving the image quality and the lamination strength after the boiling treatment, it is preferable that the ink in the ink set of the present disclosure contains two or more kinds of resin particles with different acid values. Specifically, it is preferable that the resin contained in the ink contains resin particles having an acid value of less than 30 mgKOH/g (hereinafter, also simply referred to as "resin particles A") and resin particles having an acid value of 30 mgKOH/g or greater (hereinafter, also simply referred to as "resin particles B"). The resin particles A and the resin particles B may each be used alone or two or more kinds thereof.

From the viewpoint of improving the lamination strength after the boiling treatment, the acid value of the resin particles A is preferably 20 mgKOH/g or less and more preferably 12 mgKOH/g or less. The lower limit of the acid value of the resin particles A is, for example, 0 mgKOH/g. Further, from the viewpoint of improving the image quality, the acid value of the resin particles B is preferably 45 mgKOH/g or greater and more preferably 60 mgKOH/g or greater. The upper limit of the acid value of the resin particles B is, for example, 100 mgKOH/g.

Further, in a case where the resin contains two kinds of resin particles with different acid values, the resin contains preferably two kinds of resin particles in which a difference in acid value is 30 or greater and more preferably two kinds of resin particles in which a difference in acid value is 50 or greater.

The mass ratio of the content of the resin particles A to the content of the resin particles B is preferably in a range of 1.0 to 6.0, more preferably in a range of 1.2 to 5.5, and still more preferably in a range of 1.5 to 4.0 from the viewpoint of the lamination strength and particularly preferably in a range of 2.0 to 4.0 from the viewpoints of the lamination strength and the image quality.

In a case where the ink contains resin particles having an acid value of 30 mgKOH/g or greater, the ink is further thickened in a case where the ink is applied onto the impermeable base material onto which the pretreatment liquid has been applied. In this manner, the landing interference is suppressed, and thus the image quality is further improved. In particular, in a case where the above-described mass ratio is in a range of 1.5 to 4.0, the lamination strength of the image recorded material after the boiling treatment is improved, and the image quality is excellent.

In the present disclosure, the acid value is a value measured by the method described in JIS K 0070: 1992.

In a case where the ink contains resin particles as the resin, the content of the resin particles is preferably in a range of 1% by mass to 20% by mass and more preferably in a range of 1% by mass to 10% by mass with respect to the total amount of the ink.

(Water)

The ink in the ink set of the present disclosure contains water. The content of water is not particularly limited and is, for example, in a range of 40% by mass to 70% by mass.

(Organic Solvent)

It is preferable that the ink in the ink set of the present disclosure contains an organic solvent. The ink may contain one or two or more kinds of organic solvents.

From the viewpoints of the jetting stability and the lamination strength, as the organic solvent, the ink contains preferably an organic solvent having a boiling point of lower than 200° C. and more preferably an organic solvent having a boiling point of 120° C. to 200° C.

The content of the organic solvent having a boiling point of 200° C. or higher is preferably 5% by mass or less, more preferably 2% by mass or less, and still more preferably 0% by mass with respect to the total amount of the ink. That is, it is preferable that the ink does not contain an organic solvent having a boiling point of 200° C. or higher. In a case where the ink contains an organic solvent, it is preferable that the organic solvent is an organic solvent having a boiling point of lower than 200° C.

In a case where the content of the organic solvent having a boiling point of 200° C. or higher is 5% by mass or less, the lamination strength of the image recorded material and the lamination strength after the boiling treatment are improved.

In the present disclosure, "boiling point" denotes a boiling point at 1 atm (101325 Pa). The boiling point is measured by a boiling point meter, and is measured using, for example, a boiling point measuring device (product name: "DosaTherm 300", manufactured by Titan Technologies, K. K.).

Examples of the organic solvent having a boiling point of lower than 200° C. include alkylene glycol such as ethylene glycol (197° C.) or propylene glycol (187° C.); alkylene glycol alkyl ether such as diethylene glycol monomethyl ether (194° C.), diethylene glycol dimethyl ether (162° C.), diethylene glycol ethyl methyl ether (176° C.), diethylene glycol isopropyl methyl ether (179° C.), propylene glycol monomethyl ether (121° C.), propylene glycol monobutyl ether (170° C.), propylene glycol monopropyl ether (150° C.), 3-methoxy-3-methyl-1-butanol (174° C.), propylene glycol monomethyl ether propionate (160° C.), methyl cellosolve (ethylene glycol monomethyl ether, 125° C.), ethyl cellosolve (ethylene glycol monoethyl ether, 135° C.), butyl cellosolve (ethylene glycol monobutyl ether, 171° C.), ethylene glycol-mono-tert-butyl ether (153° C.), or dipropylene glycol monomethyl ether (188° C.); an ester such as ethylene glycol monomethyl ether acetate (145° C.), ethyl acetate (154° C.), ethyl lactate (154° C.), or 3-methoxybutyl acetate (172° C.); and a ketone such as diacetone alcohol (169° C.), cyclohexanone (156° C.), or cyclopentanone (131° C.). Further, the numerical values in parentheses denote the boiling points.

Examples of the organic solvent having a boiling point of 200° C. or higher include alcohol such as 1,3-butanediol (207° C.), 1,4-butanediol (228° C.), benzyl alcohol (205° C.), or terpineol (217° C.); alkylene glycol such as diethylene glycol (244° C.), triethylene glycol (287° C.), or dipropylene glycol (230° C.); alkylene glycol alkyl ether such as diethylene glycol monoethyl ether (202° C.), diethylene glycol monobutyl ether (231° C.), triethylene glycol monomethyl ether (249° C.), triethylene glycol dimethyl ether (216° C.), diethylene glycol monohexyl ether (261° C. or higher), or tripropylene glycol monomethyl ether (243° C.); and an ester such as diethylene glycol monoethyl ether acetate (217° C.). Further, the numerical values in parentheses denote the boiling points.

The content of the organic solvent in the ink is preferably in a range of 5% by mass to 40% by mass and more preferably in a range of 10% by mass to 30% by mass with respect to the total amount of the ink.

(Additive)

The ink may contain additives such as a surfactant, a co-sensitizer, an ultraviolet absorbing agent, an antioxidant, a fading inhibitor, a conductive salt, and a basic compound, as necessary.

(Physical Properties)

The equilibrium moisture content of the solid content in the ink at 25° C. and 50% RH is 3.0% by mass or less, preferably 2.0% by mass or less, and more preferably 1.5% by mass or less. The lower limit of the equilibrium moisture content is not particularly limited and is, for example, 0.1% by mass. The equilibrium moisture content is measured by the following method.

The ink is allowed to stand in a constant-temperature tank at 60° C. for 24 hours. Further, the ink is dried in a vacuum at 60° C. for 3 hours using a constant temperature vacuum dryer (product name, "DRV420DA", manufactured by ADVANTEC Co., Ltd.), thereby obtaining a solid substance (solid content) of the ink. Thereafter, the solid substance of the ink is allowed to stand in a constant-temperature tank at 25° C. and 50% RH for 24 hours. After 24 hours, the moisture content of the solid substance of the ink is measured by a moisture vaporization method using a trace moisture measuring device (product name, "CA-200", manufactured by Mitsubishi Chemical Analytech Co., Ltd.). The moisture vaporization temperature is set to 140° C., a coulometric titration reagent (product name, "AQUAMICRON AKX", manufactured by Mitsubishi Chemical Corporation) is used as an anolyte, and a coulometric titration reagent (product name, "AQUAMICRON CxU", manufactured by Mitsubishi Chemical Corporation) is used as a catholyte.

Further, the solid substance of the ink may contain an organic solvent depending on the boiling point of the organic solvent contained in the ink.

From the viewpoint of improving the jetting stability, the pH of the ink is preferably in a range of 7 to 10 and more preferably in a range of 7.5 to 9.5. The pH is measured at 25° C. using a pH meter, for example, a pH meter (model number "HM-31", manufactured by DKK-Toa Corporation).

The viscosity of the ink is preferably in a range of 0.5 mPa·s to 30 mPa·s, more preferably in a range of 2 mPa·s to 20 mPa·s, still more preferably in a range of 2 mPa·s to 15 mPa·s, and even still more preferably in a range of 3 mPa·s to 10 mPa·s. The viscosity is measured at 25° C. using a viscometer, for example, a TV-22 type viscometer (manufactured by Toki Sangyo Co., Ltd.).

The surface tension of the ink is preferably 60 mN/m or less, more preferably in a range of 20 mN/m to 50 mN/m, and still more preferably in a range of 30 mN/m to 45 mN/m. The surface tension is measured at 25° C. by a plate method using a surface tension meter, for example, an automatic surface tension meter (product name, "CBVP-Z", manufactured by Kyowa Interface Science Co., Ltd.).

<Pretreatment Liquid>

The pretreatment liquid in the ink set of the present disclosure contains a resin and water.

(Resin)

The pretreatment liquid included in the ink set of the present disclosure contains a resin. The pretreatment liquid may contain one or two or more kinds of resins.

The kind of the resin contained in the pretreatment liquid is not particularly limited, and examples of the resin contained in the pretreatment liquid include the same resins exemplified as the resins contained in the ink. Among these, from the viewpoint of improving the lamination strength, it is preferable that the resin contained in the pretreatment liquid is an acrylic resin or a urethane resin.

In particular, from the viewpoint of further improving the lamination strength, it is preferable that both the resin contained in the pretreatment liquid and the resin contained in the ink are an acrylic resin or a urethane resin.

The resin contained in the pretreatment liquid may be the same as or different from the resin contained in the ink.

The content of the resin in the pretreatment liquid is preferably 20% by mass or less and more preferably 10% by mass or less with respect to the total amount of the pretreatment liquid. The lower limit of the content of the resin is not particularly limited, and is, for example, 0.1% by mass.

Examples of the resin include a water-soluble resin and resin particles.

Examples of the water-soluble resin include the same water-soluble resins as described in the section of the ink.

From the viewpoint of improving the image quality (particularly, the character quality), it is preferable that the resin contained in the pretreatment liquid of the ink set according to the present disclosure contains resin particles.

The resin particles may contain one or two or more kinds of resins.

It is preferable that the resin contained in the resin particles is a water-insoluble resin.

The resin particles include preferably at least one of acrylic resin particles or urethane resin particles and more preferably acrylic resin particles.

It is preferable that the resin particles are self-dispersing resin particles.

Examples of the self-dispersing resin particles include resin particles described in paragraphs 0062 to 0076 of JP2016-188345A and paragraphs 0109 to 0140 of WO2013/180074A.

The resin contained in the resin particles has preferably an aliphatic ring or an aromatic ring and more preferably an aromatic ring.

The aliphatic ring is preferably an alicyclic hydrocarbon having 5 to 10 carbon atoms and more preferably a cyclohexane ring structure, a dicyclopentanyl ring structure, a dicyclopentenyl ring, or an adamantane ring.

As the aromatic ring, a naphthalene ring or a benzene ring is preferable, and a benzene ring is more preferable.

From the viewpoint of further improving the dispersibility of the resin particles in water, it is preferable that the resin contained in the resin particles contains an ionic group.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The weight-average molecular weight of the resin in the resin particles is preferably in a range of 1,000 to 300,000, more preferably in a range of 2,000 to 200,000, and still more preferably in a range of 5,000 to 100,000.

From the viewpoint of the jetting stability, the average particle diameter of the resin particles in a case of jetting the ink using an ink jet recording method is preferably in a range of 1 nm to 200 nm, more preferably in a range of 3 nm to 200 nm, and still more preferably in a range of 5 nm to 50 nm. Further, the average particle diameter of the resin particles is acquired by measuring the volume average particle diameter using a particle size distribution measuring device, for example, "NANOTRAC UPA-EX150" (product name, manufactured by Nikkiso Co., Ltd.) according to a dynamic light scattering method.

The acid value of the resin particles is preferably 30 mg/KOH or less and more preferably 15 mg/KOH or less. In a case where the acid value thereof is 30 mg/KOH or less, the lamination strength after the boiling treatment is improved.

(Aggregating Agent)

From the viewpoint of improving the image quality (particularly, the character quality), it is preferable that the pretreatment liquid contains an aggregating agent. The aggregating agent is not particularly limited as long as the aggregating agent is a component that aggregates the components in the ink. The aggregating agent contains preferably at least one selected from the group consisting of a polyvalent metal compound, an organic acid, a metal complex, and a cationic polymer and more preferably an organic acid.

—Polyvalent Metal Compound—

Examples of the polyvalent metal compound include salts of alkaline earth metals of a group 2 (such as magnesium and calcium) in the periodic table, transition metals of a group 3 (such as lanthanum) in the periodic table, metals of a group 13 (such as aluminum) in the periodic table, and lanthanides (such as neodymium).

As salts of these metals, salts of organic acids, a nitrate, a chloride, and a thiocyanate described below are preferable.

Among these, preferred examples of the polyvalent metal compound include a calcium salt or magnesium salt of an organic acid (such as formic acid, acetic acid, or a benzoic acid), a calcium salt or magnesium salt of nitric acid, calcium chloride, magnesium chloride, and a calcium salt or magnesium salt of thiocyanic acid.

Further, it is preferable that at least a part of the polyvalent metal compound is dissociated into polyvalent metal ions and counterions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0). In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

—Metal Complex—

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable as the metal complex.

—Cationic Polymer—

In addition, the pretreatment liquid may be in a form containing one or two or more kinds of cationic polymers as an aggregating component. It is preferable that the cationic polymer is a homopolymer of a cationic monomer containing a primary to tertiary amino group or a quaternary ammonium base, or a copolymer or a condensed polymer of a cationic monomer and a non-cationic monomer. The cationic polymer may be used in any form of a water-soluble polymer or water-dispersible latex particles.

Examples of the cationic polymer include a polyvinylpyridine salt, polyalkylaminoethyl acrylate, polyalkylaminoethyl methacrylate, polyvinylimidazole, polyethyleneimine, polybiguanide, polyguanide, polyallylamine, and derivatives thereof.

From the viewpoint of the viscosity of the pretreatment liquid, it is preferable that the weight-average molecular weight of the cationic polymer is small. In a case where the pretreatment liquid is applied to a recording medium by an ink jet recording method, the weight-average molecular weight thereof is preferably in a range of 1,000 to 500,000, more preferably in a range of 1,500 to 200,000, and still more preferably in a range of 2,000 to 100,000. It is advantageous that the weight-average molecular weight thereof is 1,000 or greater from the viewpoint of aggregation rate. It is advantageous that the weight-average molecular weight thereof is 500,000 or less from the viewpoint of jetting reliability. However, in a case where the pretreatment liquid is applied to a recording medium by a method other than the ink jet recording method, the weight-average molecular weight thereof is not limited thereto.

The pretreatment liquid may contain only one or two or more kinds of aggregating agents.

The content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Water)

It is preferable that the pretreatment liquid in the ink set of the present disclosure contains water. The content of water is not particularly limited and is, for example, in a range of 50% by mass to 90% by mass.

(Organic Solvent)

It is preferable that the pretreatment liquid in the ink set of the present disclosure contains an organic solvent. The pretreatment liquid may contain only one or two or more kinds of organic solvents.

From the viewpoints of the jetting stability and the lamination strength, as the organic solvent, the ink contains preferably an organic solvent having a boiling point of lower than 200° C. and more preferably an organic solvent having a boiling point of 120° C. to 200° C.

The content of the organic solvent having a boiling point of 200° C. or higher is preferably 5% by mass or less, more preferably 2% by mass or less, and still more preferably 0% by mass with respect to the total amount of the pretreatment liquid. That is, it is preferable that the pretreatment liquid does not contain an organic solvent having a boiling point of 200° C. or higher. In a case where the pretreatment liquid contains an organic solvent, it is preferable that the organic solvent is an organic solvent having a boiling point of lower than 200° C.

In a case where the content of the organic solvent having a boiling point of 200° C. or higher is 5% by mass or less, the lamination strength of the image recorded material and the lamination strength of the image recorded material after the boiling treatment are improved.

Examples of the organic solvent having a boiling point of lower than 200° C. include those exemplified in the section of the organic solvent contained in the ink.

The content of the organic solvent in the pretreatment liquid is preferably in a range of 5% by mass to 40% by mass and more preferably in a range of 10% by mass to 30% by mass with respect to the total amount of the pretreatment liquid.

(Other Components)

The pretreatment liquid may contain other components in addition to the resin, the aggregating agent, and water as necessary. Examples of other components that may be contained in the pretreatment liquid include known additives such as a surfactant, a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties)

The equilibrium moisture content of the solid content in the pretreatment liquid at 25° C. and 50% RH is 3.0% by mass or less, preferably 1.5% by mass or less, and more preferably 1.0% by mass or less. The lower limit value of the pretreatment liquid is not particularly limited and is, for example, 0.1% by mass. The equilibrium moisture content of the solid content in the pretreatment liquid at 25° C. and 50% RH is measured by the same method as that for the equilibrium moisture content of the solid content in the ink at 25° C. and 50% RH.

It is preferable that the equilibrium moisture content of the solid content in the pretreatment liquid at 25° C. and 50% RH is less than the equilibrium moisture content of the solid content in the ink at 25° C. and 50% RH. It is considered that water is likely to infiltrate into the pretreatment layer from a side of the impermeable base material during the boiling treatment. Therefore, in a case where the equilibrium moisture content of the solid content in the pretreatment liquid at 25° C. and 50% RH is less than the equilibrium moisture content of the solid content in the ink, the lamination strength after the boiling treatment is excellent. Further, an absolute value of a difference between the equilibrium moisture content of the solid content in the pretreatment liquid at 25° C. and 50% RH and the equilibrium moisture content of the solid content in the ink at 25° C. and 50% RH is preferably in a range of 0.3 to 2.0, more preferably in a range of 0.3 to 1.0, and still more preferably in a range of 0.5 to 0.7.

The pH of the pretreatment liquid is preferably 0.1 to 4.5, more preferably 0.2 to 4.0, from the viewpoint of the aggregation rate of the ink. The pH is measured at 25° C. using a pH meter, for example, a pH meter (model number "HM-31", manufactured by DKK-Toa Corporation).

From the viewpoint of the aggregation rate of the ink, the viscosity of the pretreatment liquid is preferably in a range of 0.5 mPa s to 10 mPa s and more preferably in a range of 1 mPa s to 5 mPa s. The viscosity is a value measured at 25° C. using a viscometer. The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

<Image Recording Method>

An image recording method of the present disclosure includes a step of applying the pretreatment liquid onto the impermeable base material (hereinafter, referred to as "pretreatment liquid adding step") and a step of applying the ink onto the impermeable base material onto which the pretreatment liquid has been applied using an ink jet recording method, to record an image (hereinafter, referred to as "image recording step").

(Pretreatment Liquid Adding Step)

In the pretreatment liquid adding step, the pretreatment liquid is applied onto the impermeable base material.

—Impermeable Base Material—

In the present disclosure, the impermeability in the impermeable base material denotes a property that the water absorption rate in 24 hours which is measured in conformity with ASTM D570-98 (2018) is 2.5% or less. Here, the unit "%" of the water absorption rate is on a mass basis. The water absorption rate is preferably 1.0% or less and more preferably 0.5% or less.

Examples of the material of the impermeable base material include glass, a metal (such as aluminum, zinc, or copper), and a resin (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is preferable that the material of the impermeable base material is a resin.

Examples of the material of the impermeable base material are as described above, but polypropylene, polyethylene, polyethylene terephthalate, nylon, an acrylic resin, or polyvinyl chloride is preferable from the viewpoint of versatility.

As the shape of the impermeable base material, a sheet-like (film-like) or a plate-like impermeable base material is preferable. Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

Further, the thickness of the impermeable base material is preferably in a range of 0.1 µm to 1,000 more preferably in a range of 0.1 µm to 800 and still more preferably in a range of 11 µm to 500 µm.

The impermeable base material may be subjected to a hydrophilization treatment. Examples of the hydrophilization treatment include a corona treatment, a plasma treatment, a heat treatment, an abrasion treatment, a light irradiation treatment (such as a UV treatment), and a flame treatment, but the hydrophilization treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

The impermeable base material may be heated before the application of the pretreatment liquid. The heating temperature may be appropriately set according to the kind of the impermeable base material, but the temperature of the impermeable base material is set to be preferably in a range of 30° C. to 70° C. and more preferably in a range of 30° C. to 60° C.

—Method of Applying Pretreatment Liquid—

A method of applying the pretreatment liquid is not particularly limited, and examples thereof include known methods such as a coating method, a dipping method, and an ink jet recording method.

Examples of the coating method include known coating methods using a bar coater, an extrusion die coater, an air doctor coater, a blade coater, a rod coater, a knife coater, a squeeze coater, and a reverse roll coater.

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the pretreatment liquid onto the impermeable base material by an ink jet recording method is performed by jetting the pretreatment liquid from a nozzle of an ink jet head.

Examples of the system of the ink jet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the pretreatment liquid is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet amount of the pretreatment liquid to be jetted from a nozzle of an ink jet head is preferably in a range of 1 pico liter (pL) to 10 pL and more preferably in a range of 1.5 pL to 6 pL.

(Image Recording Step)

In the image recording step, the ink is applied onto the impermeable base material onto which the pretreatment liquid has been applied by an ink jet recording method, to record an image. The details of the ink jet recording method are the same as the details of the ink jet recording method in the method of applying the pretreatment liquid.

[Other Steps]

The image recording method of the present disclosure may include other steps in addition to the pretreatment liquid adding step and the image recording step.

After the application of the pretreatment liquid, the pretreatment liquid applied onto the impermeable base material may be heated and dried. Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

[Method of Producing Laminate]

A method of producing a laminate according to an embodiment of the present disclosure includes a step of obtaining an image recorded material that includes the impermeable base material and an image disposed on the impermeable base material by the image recording method of the present disclosure, and a step of laminating a base material for lamination on a side of the image recorded material where the image has been disposed, to obtain a laminate.

According to the image recording method using the ink set of the present disclosure, an image recorded material including the impermeable base material and an image recorded on the impermeable base material, in which the lamination strength after the boiling treatment is excellent in a case where a base material for lamination is laminated on the image, can be produced.

Therefore, the image recording method using the ink set of the present disclosure is suitably used for producing a laminate including the image recorded material and a base material for lamination which is laminated on a side of the image recorded material where the image is recorded.

According to the method for producing a laminate according to the embodiment of the present disclosure, a laminate having excellent lamination strength between the image recorded material and the base material for lamination can be produced even in a case where the boiling treatment is performed.

The step of obtaining an image recorded material can refer to the image recording method of the present disclosure described above.

The step of obtaining a laminate is a step of laminating the base material for lamination on a side of the image recorded material where the image has been disposed, to obtain a laminate. The lamination can be performed by a method of superimposing the base material for lamination on the side of the image recorded material where the image has been disposed via another layer (for example, an adhesive layer) and attaching the base material thereto, a method of attaching the base material for lamination to the side of the image recorded material where the image has been disposed via a laminator in a state where the base material is superimposed on the side thereof, or the like. In the latter case, a commercially available laminator can be used.

The lamination temperature in a case of carrying out the lamination is not particularly limited. For example, in a case where the image recorded material and the base material for lamination are attached to each other via another layer (for example, an adhesive layer), the temperature may be 20° C. or higher. Further, in a case where a laminator is used, the temperature of a laminating roll may be set to be in a range of 20° C. to 80° C. The pressure-bonding force between a pair of laminating rolls may be appropriately selected as necessary.

It is preferable that the base material for lamination is a resin base material. The resin base material is not particularly limited, and examples thereof include a base material consisting of a thermoplastic resin.

A base material obtained by molding a thermoplastic resin in a sheet shape is exemplified as the resin base material.

It is preferable that the resin base material contains polypropylene, polyethylene terephthalate, nylon, polyethylene, or polyimide.

The shape of the resin base material is not particularly limited, but it is preferable that the resin base material has a sheet shape. The thickness of the resin base material is preferably in a range of 10 μm to 200 μm and more preferably in a range of 10 μm to 100 μm.

In the step of obtaining a laminate, the base material for lamination may be laminated directly on a side of the image recorded material where the image has been disposed or via another layer (for example, an adhesive layer).

In a case where the base material for lamination is laminated directly on a side of the image recorded material where the image has been disposed, the lamination can be performed by a known method such as thermocompression bonding or thermal fusion welding.

Further, in a case where the base material for lamination is laminated on a side of the image recorded material where the image has been disposed via an adhesive layer, the lamination can be performed by, for example, a method of coating the side of the image recorded material where the image has been disposed with an adhesive, placing the base material for lamination, and bonding the image recorded material to the base material for lamination.

Further, in the case where the base material for lamination is laminated on a side of the image recorded material where the image has been disposed via an adhesive layer, the lamination can also be performed by an extrusion lamination method (that is, sandwich lamination) or the like.

It is preferable that the adhesive layer contains an isocyanate compound. In a case where the adhesive layer contains an isocyanate compound, since the adhesiveness between the adhesive layer and the image is further improved, the lamination strength can be further improved.

[Image Recorded Material]

An image recorded material according to an embodiment of the present disclosure includes an impermeable base material, and an image disposed on the impermeable base material, in which the image includes a pretreatment layer disposed on the impermeable base material and containing a resin, and an ink layer disposed on the pretreatment layer and containing a pigment and a resin, the equilibrium moisture content of the pretreatment layer at 25° C. and 50% RH is 3.0% by mass or less, and the equilibrium moisture content of the ink layer at 25° C. and 50% RH is 3.0% by mass or less.

The laminate obtained by laminating the base material for lamination on the image recorded material according to the embodiment of the present disclosure has excellent lamination strength in a case where the boiling treatment is performed.

The preferable aspects of each component in the image recorded material are the same as the preferable aspects of each component described in the section of the ink set of the present disclosure.

[Laminate]

The laminate according to an embodiment of the present disclosure includes the above-described image recorded material of the present disclosure, and the base material for lamination which is laminated on the image of the image recorded material.

The laminate according to the embodiment of the present disclosure has excellent lamination strength in a case where the boiling treatment is performed.

The base material for lamination in the laminate may be laminated directly on a side of the image recorded material where the image has been disposed or may be laminated via another layer (for example, an adhesive layer).

It is preferable that the laminate of the present disclosure is produced by the method of producing the laminate of the present disclosure.

The preferred embodiments of the base material for lamination and the adhesive layer are respectively the same as the preferred embodiments described in the section of the method of producing a laminate.

Examples

Hereinafter, the present disclosure will be described in more detail based on examples, but the present disclosure is not limited to the following examples unless the gist thereof is overstepped.

<Preparation of Pretreatment Liquid>

The following components were mixed to have the following contents, thereby preparing a pretreatment liquid.

Aggregating agent: glutaric acid: 4.1% by mass
    Resin emulsion listed in Table 1 or Table 2: 6% by mass (content of resin particles serving as solid content)
    Propylene glycol: 10 parts by mass
    Water: 79.9% by mass <Preparation of Ink>

In preparation of an ink, first, a pigment dispersion liquid was prepared.

(Preparation of Pigment Dispersion Liquid 1)

—Synthesis of Uncrosslinked Resin—

A monomer feed composition was prepared by mixing methacrylic acid (200 parts by mass), benzyl methacrylate (800 parts by mass), and isopropanol (375 parts by mass). Further, an initiator feed composition was prepared by mixing 2,2-azobis(2-methylbutyronitrile) (22.05 parts by mass) and isopropanol (187.5 parts by mass).

Next, isopropanol (187.5 parts by mass) was heated to 80° C. in a nitrogen atmosphere, and a mixture of the monomer feed composition and the initiator feed composition was added dropwise thereto for 2 hours. After completion of the dropwise addition, the obtained solution was further maintained at 80° C. for 4 hours and then cooled to 25° C.

After the solution was cooled, the solvent was removed under reduced pressure, thereby obtaining an uncrosslinked resin having a weight-average molecular weight of 30,000 and an acid value of 130 mgKOH/g.

—Crosslinking Treatment—

0.8 equivalents of the amount of methacrylic acid in the obtained uncrosslinked resin (150 parts by mass) was neutralized with a potassium hydroxide aqueous solution, and water was added thereto to adjust the concentration of the neutralized uncrosslinked resin to 25% by mass, thereby obtaining an aqueous solution of the neutralized uncrosslinked resin.

The aqueous solution of the neutralized uncrosslinked resin (50 parts by mass), C.I. Pigment Blue 15:3 (cyan pigment) (50 parts by mass), water (190 parts by mass), and dipropylene glycol (30 parts by mass) were mixed and dispersed with a beads mill (bead diameter of 0.1 mmφ, zirconia beads), thereby obtaining a dispersion liquid (uncrosslinked dispersion liquid) in which the cyan pigment was dispersed by the uncrosslinked resin. The pigment concentration of the cyan pigment was 15% by mass.

A crosslinking agent (product name, "Denacol EX-321", manufactured by Nagase ChemteX Corporation) (1.8 parts by mass) and a boric acid aqueous solution (boric acid concentration: 4% by mass) (14.3 parts by mass) were added to the uncrosslinked dispersion liquid (136 parts by mass), and the mixture was allowed to react at 50° C. for 6 and a half hours and cooled to 25° C., whereby the uncrosslinked resin was crosslinked with the crosslinking agent. In this manner, a dispersion liquid (crosslinked dispersion liquid) in which the cyan pigment was dispersed by a crosslinked resin 1 was obtained. Further, the crosslinked resin 1 is a crosslinked substance of the uncrosslinked resin. Next, water was added to the obtained crosslinked dispersion liquid, and ultrafiltration was performed using a stirring type ultra holder (manufactured by ADVANTEC) and an ultrafiltration filter (manufactured by ADVANTEC, molecular weight cut-off of 50,000, Q0500076E ultrafilter). A dispersion liquid (cyan pigment concentration of 15% by mass) in which the cyan pigment was dispersed by the crosslinked resin 1 was obtained by performing purification such that the concentration of dipropylene glycol in the crosslinked dispersion liquid was set to 0.1% by mass or less and performing concentration until the concentration of the pigment reached 15% by mass.

In the pigment dispersion liquid 1, at least a part of the surface of the cyan pigment was coated with the crosslinked resin 1.

The acid value of the crosslinked resin 1 was 60 mgKOH/g.

(Preparation of Pigment Dispersion Liquid 2)

A pigment dispersion liquid 2 was obtained by the same method as the method for the pigment dispersion liquid 1 except that the amount of the potassium hydroxide aqueous solution and the amount of the crosslinking agent in the preparation of the pigment dispersion liquid 1 were changed such that the acid value of the crosslinked resin reached 36 mgKOH/g.

In the pigment dispersion liquid 2, at least a part of the surface of the cyan pigment was coated with a crosslinked resin 2.

The acid value of the crosslinked resin 2 was 36 mgKOH/g.

(Preparation of Pigment Dispersion Liquid 3)

A pigment dispersion liquid 3 was obtained by the same method as the method for the pigment dispersion liquid 1 except that the methacrylic acid (200 parts by mass) and benzyl methacrylate (800 parts by mass) in the monomer feed composition were respectively changed to methacrylic acid (250 parts by mass) and benzyl methacrylate (750 parts by mass).

In the pigment dispersion liquid 3, at least a part of the surface of the cyan pigment was coated with a crosslinked resin 3.

The acid value of the crosslinked resin 3 was 100 mgKOH/g.

(Preparation of Ink)

An ink was prepared by adding the following components to the prepared pigment dispersion liquid. Further, the pigment dispersion liquid 2 was used in Example 15, and the pigment dispersion liquid 3 was used in Example 16. In other examples and comparative examples, the pigment dispersion liquid 1 was used.

Pigment dispersion liquid: amount set such that pigment concentration reached 4% by mass Resin particles listed in Table 1 or Table 2: amount set such that content of resin particles serving as solid content was as listed in Table 1 or Table 2

Propylene glycol: 20% by mass

Propylene glycol monomethyl ether: 5% by mass

Surfactant: OLFINE E1010 (manufactured by Nissin Chemical Co., Ltd.): 1% by mass Water: remaining amount such that total amount of ink reached 100% by mass The details of resins listed in Table 1 and Table 2 are as follows. The emulsion denotes a dispersion liquid containing a resin, and the resin is present in a liquid in the form of resin particles. The water-soluble resin denotes an aqueous solution containing a resin. In Table 1 and Table 2, the styrene acrylic resin in the columns of the type of resin is simply described as "acrylic resin".

NEOCRYL A-1105: acrylic resin emulsion, manufactured by DSM Co., Ltd.

NEOCRYL XK-110: styrene acrylic resin emulsion, manufactured by DSM Co., Ltd.

VINYBLAN 715: vinyl chloride-based emulsion, manufactured by Nissin Chemical Co., Ltd.

NEOCRYL XK-555: acrylic resin emulsion, manufactured by DSM Co., Ltd.

HIROSE M-141: acrylic resin emulsion, manufactured by Seiko PMC Corporation

NEOREZ R-4000: urethane resin emulsion, manufactured by DSM Co., Ltd.

NEOCRYL A-1091: styrene acrylic resin emulsion, manufactured by DSM Co., Ltd.

NEOCRYL A-2091: styrene acrylic resin emulsion, manufactured by DSM Co., Ltd.

HIROSE QE-1042: styrene acrylic resin emulsion, manufactured by Seiko PMC Corporation NEOCRYL A-1092: styrene acrylic resin emulsion, manufactured by DSM Co., Ltd.

VINYBLAN 2687: acrylic resin emulsion, manufactured by Nissin Chemical Co., Ltd.

NEOCRYL XK-88: styrene acrylic resin emulsion, manufactured by DSM Co., Ltd.

SUPERFLEX 620: urethane resin emulsion, manufactured by DKS Co., Ltd.

AUROREN AE-202: olefin resin emulsion, manufactured by Nippon Paper Industries Co., Ltd.

JONCRYL 61J: water-soluble styrene acrylic resin, manufactured by BASF SE

MOVINYL 972: styrene acrylic resin emulsion, manufactured by Japan Coating Resin Co., Ltd.

VINYBLAN 711: vinyl chloride-based emulsion, manufactured by Nissin Chemical Co., Ltd.

VINYBLAN A70J9: vinyl acetate-based emulsion, manufactured by Nissin Chemical Co., Ltd.

CHALINE R-1705: acrylic silicone resin emulsion, manufactured by Nissin Chemical Co., Ltd.

VINYBLAN 1129: vinyl acetate-based emulsion, manufactured by Nissin Chemical Co., Ltd.

SUPERFLEX 650: urethane resin emulsion, manufactured by DKS Co., Ltd.

SUPERFLEX 500M: urethane resin emulsion, manufactured by DKS Co., Ltd.

PERMARIN UC-20: urethane resin emulsion, manufactured by Sanyo Chemical Industries, Ltd.

MOVINYL 7720: acrylic resin emulsion, manufactured by Japan Coating Resin Co., Ltd.

ACRIT UW-550CS: acrylic resin emulsion, manufactured by Taisei Fine Chemical Co., Ltd.

NS313X: urethane resin emulsion, manufactured by Takamatsu Oil & Fat Co., Ltd.

PLASCOAT Z-446: water-soluble polyester resin, manufactured by Goo Chemical Co., Ltd.

HARDLEN EW-5313: olefin resin emulsion, manufactured by Toyobo Co., Ltd.

JONCRYL 537: acrylic resin emulsion, manufactured by BASF SE

VINYBLAN 700: vinyl chloride-based emulsion, manufactured by Nissin Chemical

VINYBLAN 701: vinyl chloride-based emulsion, manufactured by Nissin Chemical Co., Ltd.

JONCRYL PDX-7700: styrene acrylic resin emulsion, manufactured by BASF SE JONCRYL 840: acrylic resin emulsion, manufactured by BASF SE

[Image Recording]

Image recording was performed using the prepared pretreatment liquid and ink.

An ink jet recording device comprising a transport system for continuously transporting a long base material, a wire bar coater for coating the base material with the pretreatment liquid, and an ink jet head for applying the ink to the surface of the base material onto which the pretreatment liquid had been applied was prepared.

Further, a polyethylene terephthalate (PET) base material ("FE2001", manufactured by Futamura Chemical Co., Ltd., (thickness of 25 μm, width of 500 mm, length of 2000 m), hereinafter, referred to as an "impermeable base material A") serving as an impermeable base material was prepared as the base material.

A solid image of cyan color was recorded in the following manner while the impermeable base material A was continuously transported at 635 mm/sec using an ink jet recording device.

The impermeable base material A was coated with the pretreatment liquid using a wire bar coater such that the amount of the pretreatment liquid to be applied reached approximately 1.7 g/m$^2$, and the pretreatment liquid was dried at 50° C. for 2 seconds.

Next, the ink was applied to the surface of the impermeable base material A onto which the pretreatment liquid had been applied in the form of a solid image under the following application conditions, and the applied ink was dried at 80° C. for 30 seconds, thereby recording a solid image.

Both the method of drying the pretreatment liquid and the method of drying the ink were warm air drying.

—Ink Application Conditions—

Ink jet head: 1200 dpi/20 inch-width piezo full line head

Amount of ink to be jetted from ink jet head: 4.0 pL

Driving frequency: 30 kHz (transport speed of base material: 635 mm/sec)

[Evaluation]

The lamination strength of the image recorded material, the lamination strength after the boiling treatment, and the character quality were evaluated for each example and each comparative example. The evaluation method is as follows. The evaluation results are listed in Tables 1 and 2.

(Lamination Strength)

An image recorded material in which a solid image was recorded on the impermeable base material A was obtained according to the image recording described above.

A region having a length of 500 mm and a width of 500 mm (hereinafter, also referred to as a lamination strength evaluation region) in which the solid image was provided on the entire surface was cut out from the image recorded material and used as a lamination strength evaluation sample.

The solid image in the lamination strength evaluation sample was coated with an adhesive for dry lamination (main agent TM-320 (isocyanate compound)/curing agent CAT-13B (alcohol compound), manufactured by Toyo-Morton, Ltd.) using a bar coater, and a linear low-density polyethylene film (trade name, "LL-XMTN", manufactured by Futamura Chemical Co., Ltd., thickness of 40 μm) was superimposed thereon as a base material for lamination. In this state, the base material for lamination and the lamination strength evaluation sample were attached to each other, thereby obtaining a laminate.

The obtained laminate was aged at 40° C. for 48 hours.

A sample piece having a length of 100 mm and a width of 15 mm was cut out from the aged laminate.

Next, the base material for lamination and the lamination strength evaluation sample in a region from the one end in the longitudinal direction to a length of 30 mm in the sample piece were peeled by hand. The remaining region with a length of 70 mm was allowed to remain in a state where the base material for lamination and the lamination strength evaluation sample were attached to each other.

Next, a tensile test of stretching the peeled portion of the base material for lamination and the peeled portion of the lamination strength evaluation sample in opposite directions in the sample piece was performed. The stretching direction was a direction perpendicular to the above-described remaining region with a length of 70 mm (the remaining region in a state where the base material for lamination and the lamination strength evaluation sample were attached to each other).

The peel strength in the remaining region with a length of 70 mm in a case where the base material for lamination and the lamination strength evaluation sample were peeled off was acquired by this tensile test. The obtained peel strength was defined as the lamination strength. The evaluation standards are as follows. The evaluation results are listed in Tables 1 and 2.

Further, the tensile test was performed using a tensile tester (product name, "TENSILON RTM-25", manufactured by Orientec Co., Ltd.).

5: The lamination strength between the image recorded material and the base material for lamination was 2 N/15 mm or greater.

4: The lamination strength between the image recorded material and the base material for lamination was 1.5 N/15 mm or greater and less than 2 N/15 mm.

3: The lamination strength between the image recorded material and the base material for lamination was 1 N/15 mm or greater and less than 1.5 N/15 mm.

2: The lamination strength between the image recorded material and the base material for lamination was 0.5 N/15 mm or greater and less than 1 N/15 mm.

1: The lamination strength between the image recorded material and the base material for lamination was less than 0.5 N/15 mm.

(Lamination Strength after Boiling Treatment)

A laminate was prepared by the same method as the method of preparing a laminate described in the method of evaluating the lamination strength above.

The obtained laminate was aged at 40° C. for 48 hours.

The aged laminate was subjected to a boiling treatment at 95° C. for 40 minutes using an autoclave for retort food (small sterilizer) (product name, "SR-240", manufactured by Tomy Seiko Co., Ltd.).

A sample piece having a length of 100 mm and a width of 15 mm was cut out from the laminate after the boiling treatment.

Next, the tensile test was performed using the cut-out sample piece by the same method as the method for the tensile test described in the method of evaluating the lamination strength above, and the peel strength was acquired. The obtained peel strength was defined as the lamination strength. The evaluation standards are as follows. The evaluation results are listed in Tables 1 and 2.

5: The lamination strength between the image recorded material and the base material for lamination after the boiling treatment was 2 N/15 mm or greater.

4: The lamination strength between the image recorded material and the base material for lamination after the boiling treatment was 1.5 N/15 mm or greater and less than 2 N/15 mm.

3: The lamination strength between the image recorded material and the base material for lamination after the boiling treatment was 1 N/15 mm or greater and less than 1.5 N/15 mm.

2: The lamination strength between the image recorded material and the base material for lamination after the boiling treatment was 0.5 N/15 mm or greater and less than 1 N/15 mm.

1: The lamination strength between the image recorded material and the base material for lamination after the boiling treatment was less than 0.5 N/15 mm.

(Character Quality)

An image recorded material in which a character image was recorded on the impermeable base material A was obtained by the same method as that for the image recording described above. The character (Unicode: U+9DF9) illustrated in FIG. 1 was output in sizes of 4 pt, 6 pt, 8 pt, and 10 pt as the character image. Here, pt indicates the DTP point representing the font size, and 1 pt is 1/72 inch.

The character quality was evaluated by observing each character image on the image recorded material and determining whether or not the image was reproducible. The expression "able to be reproduced" means that the horizontal line indicated by 11 shown in FIG. 1 and the horizontal line indicated by 12 shown in FIG. 1 in the character images shown in FIG. 1 were separated in a case where the characters were confirmed from a place separated by 0.5 m. The evaluation standards are as follows.

The evaluation results are listed in Tables 1 and 2.

5: Characters having a size of 4 pt were reproducible.

4: Characters having a size of 6 pt were reproducible, but characters having a size of 4 pt were not reproducible.

3: Characters having a size of 6 pt were reproducible, but characters having a size of 8 pt were not reproducible.

2: Characters having a size of 10 pt were reproducible, but characters having a size of 8 pt were not reproducible.

1: Characters having a size of 10 pt were not reproducible.

The equilibrium moisture contents ("moisture content" in Tables 1 and 2) of the solid contents of the pretreatment liquid and the ink in Tables 1 and 2 at 25° C. and 50% RH were measured by the following method.

The pretreatment liquid and the ink were respectively allowed to stand in a constant-temperature tank at 60° C. for 24 hours. Further, the pretreatment liquid and the ink were dried at 60° C. for 3 hours using a constant temperature vacuum dryer (product name, "DRV420DA", manufactured by ADVANTEC Co., Ltd.), thereby obtaining solid substances of the pretreatment liquid and the ink. Thereafter, the solid substances were allowed to stand in a constant-temperature tank at 25° C. and 50% RH for 24 hours. After 24 hours, the moisture contents of the solid substances were measured by a moisture vaporization method using a trace moisture measuring device (product name, "CA-200", manufactured by Mitsubishi Chemical Analytech Co., Ltd.). The moisture vaporization temperature was set to 140° C., a coulometric titration reagent (product name, "AQUAMICRON AKX", manufactured by Mitsubishi Chemical Corporation) was used as an anolyte, and a coulometric titration reagent (product name, "AQUAMICRON CxU", manufactured by Mitsubishi Chemical Corporation) was used as a catholyte.

In Tables 1 and 2, data related to the aggregating agent contained in the pretreatment liquid, the resin contained in the pretreatment liquid, and the equilibrium moisture content of the solid content at 25° C. and 50% RH is described for the pretreatment liquid. Further, data related to the resin contained in the ink and the equilibrium moisture content of the solid content at 25° C. and 50% RH is described for the ink. Further, data related to the resin used as the dispersing agent, the resin particles A having an acid value of less than 30 mgKOH/g, and the resin particles B having an acid value of 30 mgKOH/g or greater is described for the resin contained in the ink. In Tables 1 and 2, the unit of the acid value is omitted, but the acid value is in units of "mgKOH/g". In addition, in Tables 1 and 2, "resin particles A/resin particles B" denotes a mass ratio of the content of the resin particles A to the content of the resin particles B. Further, in a case where the component listed in each column is not contained, "–" is described. As described above, JONCRYL 61J and PLASCOAT Z-446 are water-soluble resins, but are listed in the columns of resin particles.

TABLE 1

| | Pretreatment liquid | | | | |
|---|---|---|---|---|---|
| | | Resin | | | Moisture |
| | Aggregating agent | Type | Name | Content (% By mass) | content (% By mass) |
| Example 1 | — | Acryl | NEOCRYL A-1105 | 6.0 | 0.8 |
| Example 2 | Glutaric acid | Acryl | NEOCRYL A-1105 | 6.0 | 0.8 |
| Example 3 | Glutaric acid | Acryl | NEOCRYL A-1105 | 6.0 | 0.8 |
| Example 4 | Glutaric acid | Acryl | NEOCRYL A-1105 | 6.0 | 0.8 |
| Example 5 | Glutaric acid | Acryl | NEOCRYL A-1105 | 6.0 | 0.8 |
| Example 6 | Glutaric acid | Acryl | NEOCRYL A-1105 | 6.0 | 0.8 |
| Example 7 | Glutaric acid | Acryl | NEOCRYL A-1105 | 6.0 | 0.8 |
| Example 8 | Glutaric acid | Acryl | NEOCRYL A-1105 | 6.0 | 0.8 |
| Example 9 | Glutaric acid | Acryl | NEOCRYL A-1105 | 6.0 | 0.8 |

| | Ink | | | | | | | | | |
|---|---|---|---|---|---|---|---|---|---|---|
| | | Resin | | | | | | | | |
| | Dispersing agent | | Resin particles A (acid value of less than 30) | | | | Resin particles B (acid value of 30 or greater) | | | Moisture content | Resin particles A/Resin particles B |
| | Type | Acid value | Type | Name | Acid value | Content (% By mass) | Type | Name | Acid value | Content (% By mass) | (% By mass) | |
| Example 1 | Crosslinked resin 1 | 60 | Acryl | NEOCRYL A-1105 | 10 | 6.0 | | — | | | 1.3 | — |
| Example 2 | Crosslinked resin 1 | 60 | Acryl | NEOCRYL A-1105 | 10 | 6.0 | | — | | | 1.3 | — |
| Example 3 | Crosslinked resin 1 | 60 | Acryl | NEOCRYL XK-110 | 15 | 6.0 | | — | | | 1.8 | — |
| Example 4 | Crosslinked resin 1 | 60 | Acryl | NEOCRYL XK-555 | 17 | 6.0 | | — | | | 1.7 | — |
| Example 5 | Crosslinked resin 1 | 60 | Acryl | HIROSE M-141 | 19 | 6.0 | | — | | | 2.1 | — |
| Example 6 | Crosslinked resin 1 | 60 | Urethane | NEOREZ R-4000 | 4 | 6.0 | | — | | | 2.0 | — |
| Example 7 | Crosslinked resin 1 | 60 | | — | | | Acryl | NEOCRYL A-1091 | 62 | 6.0 | 2.3 | — |
| Example 8 | Crosslinked resin 1 | 60 | | — | | | Acryl | NEOCRYL A-2091 | 62 | 6.0 | 2.7 | — |

TABLE 1-continued

| | | | | | | | | | | |
|---|---|---|---|---|---|---|---|---|---|---|
| Example 9 | Crosslinked resin 1 | 60 | — | Acryl | HIROSE QE-1042 | 33 | 6.0 | 2.2 | — | |

| | Pretreatment liquid | | | | |
|---|---|---|---|---|---|
| | Aggregating agent | Resin Type | Resin Name | Content (% By mass) | Moisture content (% By mass) |
| Example 10 | Glutaric acid | Acryl | NEOCRYL A-1105 | 6.0 | 0.8 |
| Example 11 | Glutaric acid | Acryl | NEOCRYL A-1105 | 6.0 | 0.8 |
| Example 12 | Glutaric acid | Acryl | NEOCRYL A-1105 | 6.0 | 0.8 |
| Example 13 | Glutaric acid | Acryl | NEOCRYL A-1105 | 6.0 | 0.8 |
| Example 14 | Glutaric acid | Acryl | NEOCRYL A-1105 | 6.0 | 0.8 |
| Example 15 | Glutaric acid | Acryl | NEOCRYL A-1105 | 6.0 | 0.8 |
| Example 16 | Glutaric acid | Acryl | NEOCRYL A-1105 | 6.0 | 0.8 |
| Example 17 | Glutaric acid | Acryl | NEOCRYL XK-110 | 6.0 | 1.6 |
| Example 18 | Glutaric acid | Vinyl chloride | VINYBLAN 715 | 6.0 | 2.5 |
| Example 19 | Glutaric acid | Acryl | NEOCRYL A-1105 | 6.0 | 0.8 |

| | Ink | | | | | | | | | | |
|---|---|---|---|---|---|---|---|---|---|---|---|
| | Resin | | | | | | | | | Moisture content (% By mass) | Resin particles A/Resin particles B |
| | Dispersing agent | | Resin particles A (acid value of less than 30) | | | | Resin particles B (acid value of 30 or greater) | | | | |
| | Type | Acid value | Type | Name | Acid value | Content (% By mass) | Type | Name | Acid value | Content (% By mass) | |
| Example 10 | Crosslinked resin 1 | 60 | Acryl | NEOCRYL A-1105 | 10 | 5.0 | Acryl | NEOCRYL A-1091 | 62 | 1.0 | 1.4 | 5.0 |
| Example 11 | Crosslinked resin 1 | 60 | Acryl | NEOCRYL A-1105 | 10 | 4.8 | Acryl | NEOCRYL A-1091 | 62 | 1.2 | 1.4 | 4.0 |
| Example 12 | Crosslinked resin 1 | 60 | Acryl | NEOCRYL A-1105 | 10 | 4.5 | Acryl | NEOCRYL A-1091 | 62 | 1.5 | 1.5 | 3.0 |
| Example 13 | Crosslinked resin 1 | 60 | Acryl | NEOCRYL A-1105 | 10 | 3.8 | Acryl | NEOCRYL A-1091 | 62 | 2.2 | 1.7 | 1.7 |
| Example 14 | Crosslinked resin 1 | 60 | Acryl | NEOCRYL A-1105 | 10 | 3.5 | Acryl | NEOCRYL A-1091 | 62 | 2.5 | 1.8 | 1.4 |
| Example 15 | Crosslinked resin 2 | 36 | Acryl | NEOCRYL A-1105 | 10 | 4.8 | Acryl | NEOCRYL A-1091 | 62 | 1.2 | 1.3 | 4.0 |
| Example 16 | Crosslinked resin 3 | 100 | Acryl | NEOCRYL A-1105 | 10 | 4.8 | Acryl | NEOCRYL A-1091 | 62 | 1.2 | 1.5 | 4.0 |
| Example 17 | Crosslinked resin 1 | 60 | Acryl | NEOCRYL A-1105 | 10 | 6.0 | | — | | | 1.3 | — |
| Example 18 | Crosslinked resin 1 | 60 | Acryl | NEOCRYL A-1105 | 10 | 6.0 | | — | | | 1.3 | — |
| Example 19 | Crosslinked resin 1 | 60 | Vinyl chloride | VINYBLAN 715 | 8 | 6.0 | | — | | | 2.9 | — |

| | Evaluation | | |
|---|---|---|---|
| | Lamination strength | Lamination strength after boiling treatment | Character quality |
| Example 1 | 5 | 5 | 1 |
| Example 2 | 5 | 5 | 3 |
| Example 3 | 5 | 4 | 3 |
| Example 4 | 5 | 4 | 3 |
| Example 5 | 5 | 4 | 3 |
| Example 6 | 5 | 4 | 3 |
| Example 7 | 4 | 4 | 5 |
| Example 8 | 4 | 4 | 5 |
| Example 9 | 1 | 4 | 4 |
| Example 10 | 5 | 5 | 4 |
| Example 11 | 5 | 5 | 5 |

TABLE 1-continued

| | | | |
|---|---|---|---|
| Example 12 | 5 | 5 | 5 |
| Example 13 | 5 | 4 | 5 |
| Example 14 | 5 | 4 | 4 |
| Example 15 | 5 | 5 | 5 |
| Example 16 | 5 | 5 | 5 |
| Example 17 | 5 | 4 | 3 |
| Example 18 | 4 | 3 | 3 |
| Example 19 | 4 | 3 | 3 |

TABLE 2

| | Pretreatment liquid | | | | |
|---|---|---|---|---|---|
| | | Resin | | | Moisture |
| | Aggregating agent | Type | Name | Content (% By mass) | content (% By mass) |
| Comparative Example 1 | Glutaric acid | Acryl | NEOCRYL A-1092 | 6.0 | 4.4 |
| Comparative Example 2 | Glutaric acid | Vinyl chloride | VINYBLAN 711 | 6.0 | 4.1 |
| Comparative Example 3 | Glutaric acid | Vinyl acetate | VINYBLAN A70J9 | 6.0 | 3.3 |
| Comparative Example 4 | Glutaric acid | Acryl silicon | CHALINE R-170S | 6.0 | 3.8 |
| Comparative Example 5 | Glutaric acid | Vinyl acetate | VINYBLAN 1129 | 6.0 | 3.5 |
| Comparative Example 6 | Glutaric acid | Urethane | SUPERFLEX 650 | 6.0 | 3.3 |
| Comparative Example 7 | Glutaric acid | Urethane | SUPERFLEX 500M | 6.0 | 3.1 |
| Comparative Example 8 | Glutaric acid | Urethane | PERMARIN UC-20 | 6.0 | 3.2 |
| Comparative Example 9 | Glutaric acid | Acryl | MOVINYL 7720 | 6.0 | 3.7 |
| Comparative Example 10 | Glutaric acid | Acryl | ACRIT UW-550CS | 6.0 | 4.5 |

| | Ink | | | | | | | | | |
|---|---|---|---|---|---|---|---|---|---|---|
| | Resin | | | | | | | | | Resin particles A/Resin particles B |
| | Dispersing agent | | Resin particles A (acid value of less than 30) | | | | Resin particles B (acid value of 30 or greater) | | | Moisture content (% By mass) |
| | Type | Acid value | Type | Name | Acid value | Content (% By mass) | Type | Name | Acid value | Content (% By mass) | |
| Comparative Example 1 | Crosslinked resin 1 | 60 | Acryl | NEOCRYL A-1105 | 10 | 6.0 | — | | | | 1.3 | — |
| Comparative Example 2 | Crosslinked resin 1 | 60 | Acryl | NEOCRYL A-1105 | 10 | 0.1 | — | | | | 1.3 | — |
| Comparative Example 3 | Crosslinked resin 1 | 60 | Acryl | NEOCRYL A-1105 | 10 | 0.1 | — | | | | 1.3 | — |
| Comparative Example 4 | Crosslinked resin 1 | 60 | Acryl | NEOCRYL A-1105 | 10 | 0.1 | — | | | | 1.3 | — |
| Comparative Example 5 | Crosslinked resin 1 | 60 | Acryl | NEOCRYL A-1105 | 10 | 0.1 | — | | | | 1.3 | — |
| Comparative Example 6 | Crosslinked resin 1 | 60 | Acryl | NEOCRYL A-1105 | 10 | 0.1 | — | | | | 1.3 | — |
| Comparative Example 7 | Crosslinked resin 1 | 60 | Acryl | NEOCRYL A-1105 | 10 | 0.1 | — | | | | 1.3 | — |
| Comparative Example 8 | Crosslinked resin 1 | 60 | Acryl | NEOCRYL A-1105 | 10 | 0.1 | — | | | | 1.3 | — |
| Comparative Example 9 | Crosslinked resin 1 | 60 | Acryl | NEOCRYL A-1105 | 10 | 0.1 | — | | | | 1.3 | — |
| Comparative Example 10 | Crosslinked resin 1 | 60 | Acryl | NEOCRYL A-1105 | 10 | 0.1 | — | | | | 1.3 | — |

TABLE 2-continued

| | | Pretreatment liquid | | | |
|---|---|---|---|---|---|
| | | | Resin | | Moisture |
| | Aggregating agent | Type | Name | Content (% By mass) | content (% By mass) |
| Comparative Example 11 | Glutaric acid | Urethane | NS313X | 6.0 | 4.2 |
| Comparative Example 12 | Glutaric acid | Ester | PLASCOAT Z446 | 6.0 | 3.9 |
| Comparative Example 13 | Glutaric acid | Olefin | HARDLEN EW-5313 | 6.0 | 3.7 |
| Comparative Example 14 | Glutaric acid | Acryl | NEOCRYL A-1105 | 6.0 | 0.8 |
| Comparative Example 15 | Glutaric acid | Acryl | VINYBLAN 2687 | 6.0 | 4.4 |
| Comparative Example 16 | Glutaric acid | Acryl | NEOCRYL XK-88 | 6.0 | 3.1 |
| Comparative Example 17 | Glutaric acid | Urethane | SUPERFLEX 620 | 6.0 | 4.0 |
| Comparative Example 18 | Glutaric acid | Olefin | AUROREN AE-202 | 6.0 | 3.2 |
| Comparative Example 19 | Glutaric acid | Acryl | JONCRYL 61J | 6.0 | 5.0 |
| Comparative Example 20 | Glutaric acid | Acryl | MOVINYL 972 | 6.0 | 3.1 |

| | | | Ink | | | | | | | |
|---|---|---|---|---|---|---|---|---|---|---|
| | | | Resin | | | | | | | |
| | | | Resin particles A (acid value of less than 30) | | | Resin particles B (acid value of 30 or greater) | | | Moisture | Resin particles |
| | Dispersing agent | | | | Content | | | Content | content | A/Resin |
| | Type | Acid value | Type | Name | Acid value | (% By mass) | Type | Name | Acid value | (% By mass) | (% By mass) | particles B |

| | Type | Acid value | Type | Name | Acid value | Content (% By mass) | Type | Name | Acid value | Content (% By mass) | Moisture content (% By mass) | A/B |
|---|---|---|---|---|---|---|---|---|---|---|---|---|
| Comparative Example 11 | Crosslinked resin 1 | 60 | Acryl | NEOCRYL A-1105 | 10 | 0.1 | — | | | | 1.3 | — |
| Comparative Example 12 | Crosslinked resin | 60 | Acryl | NEOCRYL A-1105 | 10 | 0.1 | — | | | | 1.3 | — |
| Comparative Example 13 | Crosslinked resin 1 | 60 | Acryl | NEOCRYL A-1105 | 10 | 0.1 | — | | | | 1.3 | — |
| Comparative Example 14 | Crosslinked resin 1 | 60 | | — | | | Acryl | NEOCRYL A-1092 | 55 | 6.0 | 3.2 | — |
| Comparative Example 15 | Crosslinked resin 1 | 60 | | — | | | Acryl | JONCRYL 537 | 40 | 6.0 | 3.1 | — |
| Comparative Example 16 | Crosslinked resin 1 | 60 | | — | | | Vinyl chloride | VINYBLAN 700 | 57 | 6.0 | 3.5 | — |
| Comparative Example 17 | Crosslinked resin 1 | 60 | | — | | | Vinyl chloride | VINYBLAN 701 | 46 | 6.0 | 3.3 | — |
| Comparative Example 18 | Crosslinked resin 1 | 60 | | — | | | Acryl | JONCRYL PDX-7700 | 60 | 6.0 | 3.0 | — |
| Comparative Example 19 | Crosslinked resin 1 | 60 | | — | | | Acryl | JONCRYL 61J | 195 | 6.0 | 4.8 | — |
| Comparative Example 20 | Crosslinked resin 1 | 60 | | — | | | Acryl | JONCRYL 840 | 87 | 6.0 | 3.6 | — |

| | Evaluation | | |
|---|---|---|---|
| | Lamination strength | Lamination strength after boiling treatment | Character quality |
| Comparative Example 1 | 5 | 2 | 3 |
| Comparative Example 2 | 2 | 1 | 3 |
| Comparative Example 3 | 4 | 1 | 3 |
| Comparative Example 4 | 1 | 1 | 3 |
| Comparative Example 5 | 4 | 1 | 3 |
| Comparative Example 6 | 2 | 1 | 3 |
| Comparative Example 7 | 5 | 1 | 3 |

TABLE 2-continued

| | | | |
|---|---|---|---|
| Comparative Example 8 | 5 | 1 | 3 |
| Comparative Example 9 | 5 | 1 | 3 |
| Comparative Example 10 | 5 | 1 | 3 |
| Comparative Example 11 | 5 | 1 | 3 |
| Comparative Example 12 | 5 | 1 | 3 |
| Comparative Example 13 | 4 | 1 | 3 |
| Comparative Example 14 | 4 | 2 | 5 |
| Comparative Example 15 | 4 | 1 | 4 |
| Comparative Example 16 | 2 | 1 | 5 |
| Comparative Example 17 | 2 | 1 | 5 |
| Comparative Example 18 | 4 | 1 | 4 |
| Comparative Example 19 | 2 | 1 | 4 |
| Comparative Example 20 | 3 | 1 | 4 |

As listed in Table 1, in Examples 1 to 19, it was found that since the pretreatment liquid contained a resin and water, the ink contained a pigment, a resin, and water, the equilibrium moisture content of the solid content in the pretreatment liquid at 25° C. and 50% RH was 3.0% by mass or less, and the equilibrium moisture content of the solid content in the ink at 25° C. and 50% RH was 3.0% by mass or less, the lamination strength after the boiling treatment was excellent.

On the contrary, as listed in Table 2, in Comparative Examples 1 to 20, it was found that since one or both the equilibrium moisture content of the solid content in the pretreatment liquid at 25° C. and 50% RH and the equilibrium moisture content of the solid content in the ink at 25° C. and 50% RH were greater than 3.0% by mass, the lamination strength after the boiling treatment was degraded.

In Example 2, it was found that since the equilibrium moisture content of the solid content in the ink at 25° C. and 50% RH was 1.5% by mass or less, the lamination strength after the boiling treatment was excellent as compared with Examples 3 to 6.

In Example 10, it was found that since the ink contained resin particles having an acid value of less than 30 mgKOH/g and resin particles having an acid value of 30 mgKOH/g or greater, the character quality was excellent as compared with Example 2.

In Examples 11 to 13, 15, and 16, it was found that since the mass ratio of the content of the resin particles having an acid value of less than 30 mgKOH/g to the content of the resin particles having an acid value of 30 mgKOH/g or greater was in a range of 1.5 to 4.0, all the lamination strength, the lamination strength after the boiling treatment, and the character quality were excellent as compared with Examples 10 and 14.

In Example 17, it was found that since the resin contained in the pretreatment liquid and the resin contained in the ink were each an acrylic resin, the lamination strength and the lamination strength after the boiling treatment were excellent as compared with Examples 18 and 19.

The present disclosure of JP2021-015957 filed on Feb. 3, 2021 is incorporated herein by reference in its entirety. Further, all documents, patent applications, and technical standards described in the present specification are incorporated herein by reference to the same extent as in a case of being specifically and individually noted that individual documents, patent applications, and technical standards are incorporated by reference.

What is claimed is:

1. An ink jet ink set for an impermeable base material, comprising:
    a pretreatment liquid comprising a resin and water; and
    an ink comprising a pigment, a resin, and water,
    wherein an equilibrium moisture content of a solid content in the pretreatment liquid at 25° C. and 50% RH is 3.0% by mass or less, and
    an equilibrium moisture content of a solid content in the ink at 25° C. and 50% RH is 3.0% by mass or less, and
    wherein the equilibrium moisture content is a moisture content measured after being stood in a constant-temperature tank at 25° C. and 50% relative humidity (RH) for 24 hours.

2. The ink jet ink set for an impermeable base material according to claim 1,
    wherein the equilibrium moisture content of the solid content in the pretreatment liquid at 25° C. and 50% RH is less than the equilibrium moisture content of the solid content in the ink at 25° C. and 50% RH.

3. The ink jet ink set for an impermeable base material according to claim 1,
    wherein the resin comprised in the ink comprises resin particles.

4. The ink jet ink set for an impermeable base material according to claim 1,
    wherein the resin comprised in the ink comprises resin particles having an acid value of less than 30 mgKOH/g and resin particles having an acid value of 30 mgKOH/g or greater.

5. The ink jet ink set for an impermeable base material according to claim 4,
    wherein a mass ratio of a content of the resin particles having an acid value of less than 30 mgKOH/g to a content of the resin particles having an acid value of 30 mgKOH/g or greater is in a range of 1.5 to 4.0.

6. The ink jet ink set for an impermeable base material according to claim 1,
wherein the equilibrium moisture content of the solid content in the ink at 25° C. and 50% RH is 1.5% by mass or less.

7. The ink jet ink set for an impermeable base material according to claim 1,
wherein the equilibrium moisture content of the solid content in the pretreatment liquid at 25° C. and 50% RH is 1.5% by mass or less.

8. The ink jet ink set for an impermeable base material according to claim 1,
wherein the resin comprised in the pretreatment liquid and the resin comprisedin the ink are each an acrylic resin or a urethane resin.

9. An image recording method using the ink jet ink set for an impermeable base material according to claim 1, the method comprising:
applying the pretreatment liquid onto an impermeable base material; and
applying the ink onto the impermeable base material onto which the pretreatment liquid has been applied, using an ink jet recording method, to record an image.

10. A method of producing a laminate, comprising:
obtaining an image recorded material that includes the impermeable base material and an image disposed on the impermeable base material by the image recording method according to claim 9; and
laminating a base material for lamination on a side of the image recorded material where the image has been disposed, to obtain a laminate.

11. An image recorded material comprising:
an impermeable base material; and
an image disposed on the impermeable base material, wherein the image comprises a pretreatment layer disposed on the impermeable base material and comprising a resin, and an ink layer disposed on the pretreatment layer and comprising a pigment and a resin, an equilibrium moisture content of the pretreatment layer at 25° C. and 50% RH is 3.0% by mass or less, and an equilibrium moisture content of the ink layer at 25° C. and 50% RH is 3.0% by mass or less, and wherein the equilibrium moisture content is a moisture content measured after being stood in a constant-temperature tank at 25° C. and 50% relative humidity (RH) for 24 hours.

12. A laminate comprising:
the image recorded material according to claim 11; and
a base material for lamination which is laminated on the image of the image recorded material.

\* \* \* \* \*